(No Model.)
H. L. BRADLEY.
WARDROBE HOOK.
No. 379,759. Patented Mar. 20, 1888.
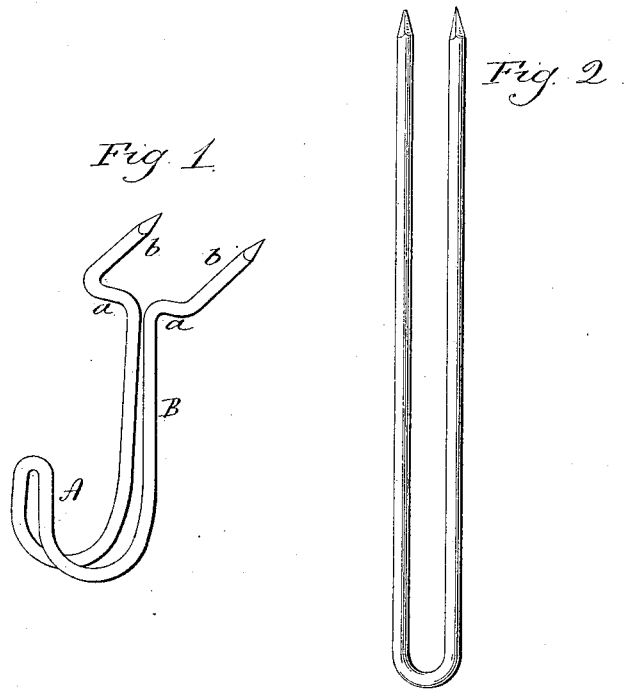
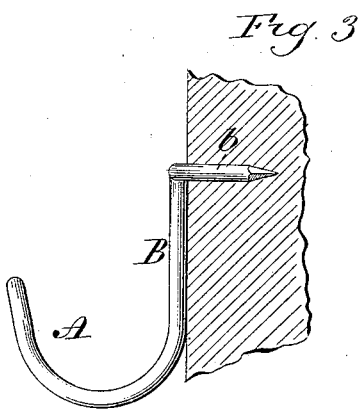

UNITED STATES PATENT OFFICE.

HENRY L. BRADLEY, OF NEW HAVEN, CONNECTICUT.

WARDROBE-HOOK.

SPECIFICATION forming part of Letters Patent No. 379,759, dated March 20, 1888.

Application filed November 21, 1887. Serial No. 255,716. (No model.)

*To all whom it may concern:*

Be it known that I, HENRY L. BRADLEY, of New Haven, in the county of New Haven and State of Connecticut, have invented a new Improvement in Wardrobe-Hooks; and I do hereby declare the following, when taken in connection with accompanying drawings and the letters of reference marked thereon, to be a full, clear, and exact description of the same, which said drawings constitute part of this specification, and represent, in—

Figure 1, a perspective view of the hook complete; Fig. 2, the blank as doubled preparatory to shaping the hook; Fig. 3, the hook as applied to a cleat.

This invention relates to an improvement in that class of wardrobe-hooks which are constructed so as to be driven into the wall or cleat, as the case may be, the object of the invention being a simple construction of hook made from wire, which will be strong and give a firm support, so as to prevent the hook turning upon the shank which is driven into the wall; and it consists in a hook made from a single piece of wire doubled to form the point of the hook, the two branches bent into hook shape, and at their extreme ends bent to bring the said ends into a plane at right angles to the body of the hook distant from and parallel with each other, as hereinafter described.

The hook is constructed from wire of size and length according to the size and strength of the hook required. The blank is first doubled, as indicated in Fig. 2, the two sides or legs of equal length, and pointed. The doubling of the end forms a rounded termination, and the two legs are bent into shape to form the hook A. Near the ends the two legs are bent at right angles to each other and in the plane with the back or body B of the hook, as indicated at *a a*, Fig. 1. Then the extreme end portions are turned backward at right angles to the body of the hook to form the shanks *b b*, which are preferably parallel with each other and in the same plane; but each is independent of the other, from the fact that the two legs or branches are not united. These shanks form the means of securing the hook to the wall or cleat, as the case may be, and they are driven into the wall or cleat, as indicated in Fig. 3, so as to bring the body of the hook to a bearing, and because the two shanks stand distant from each other and from the body of the hook they form a support for the hook to prevent its turning to the right or left, as a wire hook is liable to do when provided only with a single driving-shank. Again, by making the two legs or branches separate from each other one of the shanks may be first driven from one side and then the other shank driven from the opposite side of the hook. This is found to be a convenience in attaching the hook.

The hook is extremely cheap in its construction, and is adapted to be made by machinery, whereby its cost of manufacture is trifling.

I claim—

The herein-described wardrobe-hook made from a single piece of wire doubled to form a rounded tip to the hook, the two branches near their ends turned from each other, the end portions turned backward at right angles to the body of the hook and substantially parallel with each other, substantially as described.

HENRY L. BRADLEY.

Witnesses:
FRED C. EARLE,
J. H. SHUMWAY.